United States Patent [19]
Schnyder et al.

[11] 3,883,314
[45] May 13, 1975

[54] SELF-LUBRICATION BEARING MEMBER

[75] Inventors: Edouard Schnyder, Bienne; Marcel Liengme, Cormoret, both of Switzerland

[73] Assignee: Omega, Louis Brandt & Frere S.A., Bienne, Switzerland

[22] Filed: Apr. 12, 1973

[21] Appl. No.: 350,500

Related U.S. Application Data

[63] Continuation-in-part of Ser. No. 149,395, June 2, 1971, abandoned.

[30] Foreign Application Priority Data

June 29, 1970 Switzerland.......................... 9775/70

[52] U.S. Cl. .............. 29/182.5; 29/182; 29/182.8; 75/200; 75/201; 75/202; 75/203; 75/204; 75/205; 75/206; 75/214; 75/224; 252/12.2
[51] Int. Cl........ C22c 29/00; B22f 3/16; C22c 1/04
[58] Field of Search ............ 75/201, 222, 214, 224, 75/200, 202–206; 29/182.1, 182.8, 182.5, 182; 252/12.2

[56] References Cited
UNITED STATES PATENTS

| | | | |
|---|---|---|---|
| 2,731,360 | 1/1956 | Love................................. | 75/201 X |
| 2,788,324 | 4/1957 | Mitchell............................ | 75/201 X |
| 3,234,311 | 2/1966 | Pratt et al......................... | 75/201 X |
| 3,273,977 | 9/1966 | Davis................................ | 75/201 X |
| 3,357,818 | 12/1967 | Findeisen........................ | 75/201 X |

FOREIGN PATENTS OR APPLICATIONS

| | | | |
|---|---|---|---|
| 39-16760 | 1/1964 | Japan................................. | 75/201 |
| 674,056 | 6/1952 | United Kingdom................. | 75/201 |
| 456,948 | 5/1949 | Canada.............................. | 75/201 |

*Primary Examiner*—Benjamin R. Padgett
*Assistant Examiner*—R. E. Schafer
*Attorney, Agent, or Firm*—Imirie, Smiley & Linn

[57] ABSTRACT

The present invention relates to a self-lubricating bearing member comprising a metallic base material, the pores of which are filled with a lubricant. It also relates to a process for the manufacture of such a bearing member comprising forming a mixture, compressing it in a mold, submitting the product so obtained to a thermal treatment, while providing the base material with a definite porosity and introducing a lubricant into the pores of the base material.

13 Claims, 5 Drawing Figures

SELF-LUBRICATION BEARING MEMBER

CROSS-REFERENCE TO RELATED APPLICATION

This application is a continuation-in-part application of Ser. No. 149,395, filed June 2, 1971 now abandoned.

BACKGROUND OF THE INVENTION

The present invention relates to a self-lubricating bearing member comprising a porous base material which may be either a metal carbide, a metal boride, metal nitride, metal silicide, and metal oxide, a metal, or a metal alloy, or mixtures thereof, in combination with a lubricant.

Self-lubricating bearings are well known and are employed in a variety of technical arts, including the timepiece industry. The base material is usually a porous metallic structure made of copper or iron, prepared by the methods of powder metallurgy, wherein metallic powders are sintered to produce a porous sponge structure. The base material is then impregnated with a suitable lubricant, the resultant product being adapted for use as a bearing liner, and the like. Bearings of this type are described, for example, in U.S. Pat. Nos. 2,788,324, 3,357,818, 3,273,977, 3,234,311, and 2,731,360, British Pat. No. 674,056, Canadian Pat. No. 456,948, and Japanese Pat. No. 39-16760.

Bearings of the character described in the prior art have usually been designed for use in comparatively high speed or high load applications, such as in heavy machinery, in automotive industry, and the like. Experience has shown that self-lubricating bearings suitable for these larger dimension applications are not well suited for use in small scale units, such as those found in timepieces, particularly watches. The specific conditions of lubrication over a long period with a minimum of attention which obtain in the case of a miniature bearing are not the same as those existing in larger sized bearings, so that mere reduction in dimensions of standard types of self-lubricating bearings will not suffice to meet the special requirements of timepiece bearings.

SUMMARY OF THE INVENTION

In accordance with the present invention, there is provided a novel self-lubricating friction member, such as a bearing, and the process of making the same, which is particularly designed for small scale application, as for example, in timepieces, watch bearings, scientific instruments, and the like. It will be understood, however, that the invention is of general applicability in the self-lubricating bearing field, and that it may be employed for the manufacture of bearings and the like in a wide variety of other applications, including the more conventional areas in which bearings are used.

The bearing member of the present invention comprises three elements: (1) a porous base material, (2) a soap admixed with said base material, and (3) a lubricant with which the base material is filled.

The base material comprises at least one metal, or metal alloy, or metal compound which may be a metal carbide, metal boride, metal nitride, metal silicide, or metal oxide, or mixtures of the foregoing substances.

Examples of suitable metal carbides include the carbides of tungsten, vanadium, tantalum.

Examples of suitable metal borides include the borides of zirconium, chromium, and titanium.

Examples of suitable metal nitrides include the nitrides of titanium, vanadium, and tantalum.

Examples of metal silicides include the silicides of molybdenum, tungsten, and chromium.

Examples of metal oxides include the oxides of aluminum and magnesium.

Examples of free metals include copper, cobalt, nickel, titanium, beryllium, indium, and tungsten.

These metals may be employed in admixture with the foregoing carbides, borides, nitrides, silicides and oxides.

Examples of suitable metallic alloys include copper-beryllium, copper-lead, nickel-chromium, and iron-nickel-molybdenum.

These metals, metal compounds, alloys, and mixtures thereof are described in more detail in the various examples given below.

DETAILED DESCRIPTION OF THE INVENTION

The metallic base materials for the self-lubricating bearings of the invention are prepared in accordance with conventional techniques of powder metallurgy. The metal, metal alloy, or metal compounds are first prepared in the form of finely divided pulverulent particles, having a particle size generally in the range of about 0.5 to about 6 microns, with specific particle sizes depending upon the type of material or materials constituting the bearing member. The selection of the proper particle size is a factor in achieving optimum density of the final product.

The term metal alloys as employed herein is to be understood in its general sense, as descriptive of a product of metallic character resulting from the incorporation of two or more metals to form a metallic product, where the metals may or may not be in chemical combination. The cognate term pseudo-alloy as employed herein is to be understood as denoting a metallic product comprising two or more metals physically united in the same mass, but not alloyed together.

The bearing members of the present invention are manufactured, as described more fully below, under conditions such that the resulting base material will have a porosity between about 1 and about 40 percent by volume, the pores being simultaneously filled with a soap and a lubricant. The bearing members of the invention advantageously have a hardness of between about 200 and about 2,400° Vickers.

The process of manufacture of the bearing members of the invention in general comprises the steps of forming a homogeneous mixture of the finely divided metallic base material described above, and a metal soap, the soap also being in finely divided or pulverulent state. The mixture is then compressed under a pressure of between about 2 and about 15 metric tons per square centimeter in a mold. Thereafter the compressed product is subjected to a thermal treatment in an inert atmosphere, under conditions which result in the desired degree of porosity. The pores thus obtained are filled with a lubricant having a coefficient of friction of between about 0.002 and about 0.300 and a viscosity of at least 1.5° on the Engler scale at the temperature of use. The viscosity is chosen so as to prevent the lubricant from running out of the pores of the base material of its own accord.

Examples of suitable metal soaps for use in the process of manufacture according to the invention include metal salts of fatty acids, such as stearic acid, for example stearates of copper, cadmium, sodium or zinc. These compounds may also function as lubricant, alone or in conjunction with the other lubricants.

Examples of suitable lubricants include those which are viscous liquids, or which are semi-solid, such as, for example, synthetic oils or greases, such as those sold under the designations "Synt-A-Lube" oil, various types of silicone oils having the designation "DC 300/1000 c ST," greases known as "Azeol Sylitea 4-018" or "Esso Beacon 325," or any other product having the characteristics described above. Further, there may be employed as lubricants, synthetic thermoplastic materials, such as polytetrafluoroethylene ("Teflon TEF 23"), or a polyamide, such as "Polyamid 6" preferably having 30 percent of Teflon incorporated therein. It is also possible to utilize certain thermosetting resinous materials, such as acetal type resins, sold under the designation "Delrin."

The above-mentioned lubricants can be admixed with solid lubricants, such as, for example, molybdenum disulfide, tungsten bisulfide, graphite, or any powdered metal materials generally used for this purpose. Inorganic materials can serve as adjuncts to the lubricants, for example glass fibers, glass balls, and the like. The incorporation of such materials permits lowering of the coefficient of friction, reduction of rate of wear, and increase of the mechanical resistance of the bearing member in accordance with the present invention.

Due to its viscosity, the lubricant is maintained in the pores of the base material so as to ensure the continuous renewal of the film of lubricant existing between the contact surfaces being subjected to friction.

The process of manufacture of the bearing members of the invention, and their embodiment in shaped objects will be better understood by reference to the accompanying drawings in which.

Figure 1:
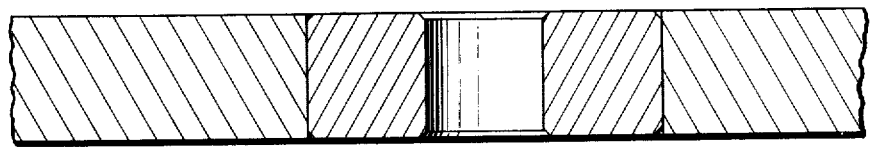
FIG. 1 is a schematic sectional view of a bearing made according to the invention, having a cylindrical bore extending therethrough.
Figure 2:
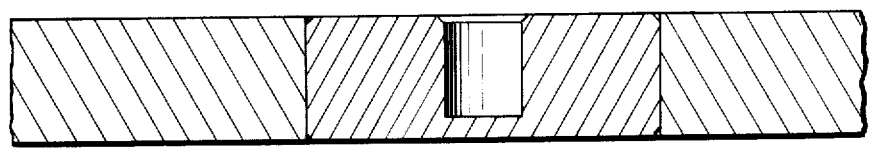
FIG. 2 is a schematic sectional view of a similar bearing having a blind bore.
Figure 3:
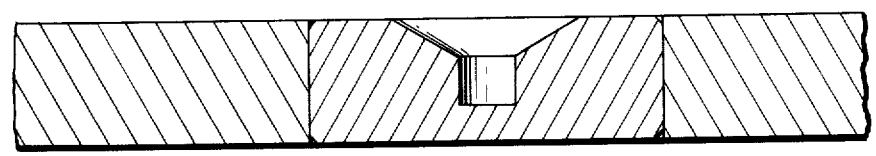
FIG. 3 is a schematic sectional view of a similar bearing adapted for a balance wheel for a watch.
Figure 4:
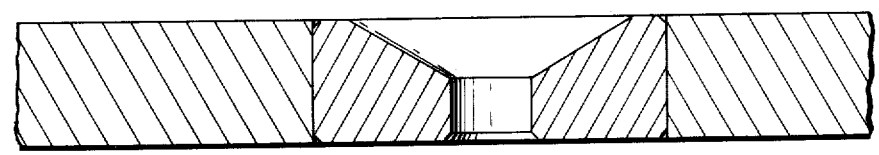
FIG. 4 is a schematic sectional view of a similar bearing provided with an oil sink.

In order to manufacture the self-lubricating friction member of the present invention, including those embodiments illustrated in the drawings a homogeneous mixture of the base material and the metal soap is first formed, the base material and the soap being in the pulverulent state. As an example of a metallic soap which may be used in the present invention there may be mentioned zinc stearate. The mixture is then compressed, hot or cold, under a pressure between about 2 and about 15 metric tons/cm$^2$ in a mold. The addition of the metallic soap to the base material ensures lubrication of the compression mold and prevents the compressed material from sticking to the walls of the mold. The particle size of the metallic base material ranges from about 0.5 to about 6 microns, and that of the metal soap is similar.

This operation is followed by heating the compressed material in an oven, which heating can last for several hours, without compression and in an inert atmosphere, the composition of which can vary in accordance with the materials used. The treatment temperature is in the range of about 1,200°C to about 1,800°C.

In the course of at least one of the last two operations (compression and heating in an oven), the porosity of the base material is adjusted to between 1 and 40 percent by volume. This porosity is obtained either by adjusting the pressure exerted on the powder during its compression, or by including in the mixture of powders, in a proportion determined by the porosity to be obtained, a substance which is subsequently eliminated from the mixture by an appropriate thermal or chemical treatment. The value of the porosity can also be varied by adjusting the temperature and the length of thermal treatment following the compression treatment.

The heating of the mixture in the oven can be omitted when the powders are subjected to a hot compression treatment. In this case, the two operations of compression and thermal treatment are carried out simultaneously.

It is necessary to take into account the shrinkage of the materials after the thermal treatment in order to guarantee precision in the shape of the final product.

The processes of compression and thermal treatment can be repeated as many times as are necessary depending upon the particular materials used, the shape of the resultant product and the necessity of improving the physical or chemical characteristics of the materials forming the friction member.

Thereafter, the lubricant is introduced into the pores of the base material, by soaking, preferably by carrying out the reaction under vacuum, or by compression, or pulverisation or a combination of these processes, or even by any other process adapted to the characteristics of the lubricant used and of the porosity of the base material.

A thermal and/or chemical treatment can also be effected after the introduction of the lubricant, so as to calcine the superficial layer of the product obtained, to augment its hardness or to improve other physical or chemical characteristics.

It is also possible to expose the product to beta and/or gamma radiation to achieve similar results.

The resultant product is submitted to at least one finishing operation in order to impart a definite shape thereto, for example by compression, punching, ultrasonic machining, application or laser beams, or by projection of hard particles contained in a jet of gas issuing at high speed from a pipe.

The base material of the bearing member can be in the form of a metal compound, for example, a carbide, as exemplified in Examples 1-3 below:

| EXAMPLE 1 | % BY WEIGHT |
| --- | --- |
| Tungsten carbide | 92–94 |
| Cobalt | 6–8 |
| The particle size ranges from 1–3 microns | |

| EXAMPLE 2 | % BY WEIGHT |
| --- | --- |
| Tungsten carbide | 90.5–93.5 |
| Cobalt | 6–8 |
| Vanadium carbide | 0.5 |
| Tantalum carbide | 1 |
| The particle size ranges from 1–3 microns. | |

| EXAMPLE 3 | % BY WEIGHT |
|---|---|
| Titanum carbide | 65 |
| Vanadium carbide | 25 |
| Nickel | 10 |
| The particle size ranges from 1-2 microns. | |

The metallic base material of the friction member can also be a compound of a boride, as exemplified in the following Examples 4-6:

EXAMPLE 4

Zirconium boride ($ZrB_2$) without any metal. The particles having a size of about 2 microns.

| EXAMPLE 5 | % BY WEIGHT |
|---|---|
| Chromium boride ($CrB_2$) | 85 |
| Nickel | 15 |
| The particles have a size of about 1.5 microns. | |

EXAMPLE 6

Titanium boride ($TiB_2$) with about 31.12 percent of weight of bore. The size of the particles is about 4 microns.

Further the metallic base material of the friction member in accordance with the present invention can be formed of nitride compounds, as set forth below in Examples 7-9:

EXAMPLE 7

Titanium nitride (TiN) with about 22.63 percent of weight of nitrogen. The particles have a size of about 2 microns.

EXAMPLE 8

Vanadium nitride (VN) with about 21.5 percent of weight of nitrogen. The particles have a size of about 1.5 microns.

EXAMPLE 9

Tantalum nitride (TaN) with about 7.19 percent of weight of nitrogen. The size of the particles is about 0.5 microns.

The base material of the friction member can further be formed of silicide compounds like the following in Examples 10-12:

EXAMPLE 10

Molybdenum silicide ($MoSi_2$) with about 36.9 percent of weight of silicon. The size of the particles is about 1 micron.

EXAMPLE 11

Tungsten silicide ($WSi_2$) with about 23.4 percent of weight of silicon, the particles have a size of about 1.5 microns.

EXAMPLE 12

Chromium silicide ($CrSi_2$) with about 51.9 percent of weight of silicon. The particles have a size of about 1 micron.

In further embodiments of the bearing member according to the invention, the metallic base material can consist of oxide compounds, as exemplified in Examples 13 and 14:

EXAMPLE 13

Aluminum oxide ($Al_2O_3$) with 4.4–5.5 percent of weight of oxygen. The particles have a size of about 5 microns.

EXAMPLE 14

Magnesium oxide (MgO) with about 5 percent of weight of oxygen, the particles have a size of about 5 microns.

Further the metallic base material of the bearing member can consist of pure metals, as given below in Examples 15-17:

EXAMPLE 15

Copper with particles having a size of about 5 microns.

EXAMPLE 16

Titanium with particles of a size of 4–5 microns.

EXAMPLE 17

Tungsten in particles of 0.5 to 1 micron size.

It is further possible to select the basic material from the group of metal alloys, as illustrated below, in Examples 18 and 19:

| EXAMPLE 18 | % BY WEIGHT |
|---|---|
| Copper | 98 |
| Beryllium | 2 |
| The particles have a size of about 5 microns. | |

| EXAMPLE 19 | % BY WEIGHT |
|---|---|
| Nickel | 80 |
| Chrome | 20 |
| The particle size ranges from 4 to 5 microns. | |

Further the metallic base material of the bearing member in accordance with the invention can be formed of a pseudo-alloy like that in the following Examples 20 and 21:

| EXAMPLE 20 | % BY WEIGHT |
|---|---|
| Copper | 62 |
| Lead | 38 |
| The particles have a size of about 5 microns. | |

In a further embodiment, the basic material of the bearing member can be a mixture, such as that given in Example 21:

| EXAMPLE 21 | % BY WEIGHT |
|---|---|
| Indium | 85 |
| Aluminum oxide | 15 |
| The size of the particles ranges from 1 to 6 microns. | |

The process of manufacture of a self-lubricating bearing member in accordance with the present invention, in general comprises first forming a homogeneous mixture of a metal base material as illustrated in Examples 1-21, and a metal soap, the metal base material and the soap being in the pulverulent state and having a particle size correspond to those indicated in the foregoing Examples.

Figure 5:
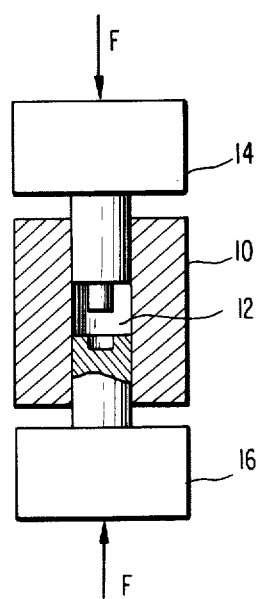
FIG. 5 is a schematic sectional view of a mold suitable for preparation of the bearings of FIGS. 1–4.

A bearing member, as shown for example in FIGS. 1 to 4 can be manufactured, using the molding means represented in FIG. 5 as comprising a die 10 defining an axial compression chamber 12 within which upper and lower compression members 14 and 16, respectively, under pressure in the directions of the arrows F.

The following examples illustrate the practice of the method of producing the self-lubricating bearing member of the invention, but are not to be considered as limiting:

EXAMPLE 22

The following powders with particle size ranging from 0.5 to 1.5 microns are used to form the base material:

|  | % by weight |
|---|---|
| Tungsten carbide | 81 |
| Aluminum oxide | 13 |
| Cobalt | 6 |

According to the desired mechanical characteristics of the bearing member to be manufactured, alternate procedures are applicable, as set forth below:

PROCEDURE 1

The following steps, are performed preferably in the indicated order:

a. Mixing 1 percent of volume of zinc stearate with the base material ingredient listed above;

b. Mixing all these materials for a period of about 60 hours;

c. Cold compressing the mixture in a mold according to FIG. 5. A pressure of 2 metric tons/cm² is applied during 90 seconds. The porosity of the friction member thus obtained is 30 percent of the total volume.

d. Thermal treatment at 1300° C for 6 hours in an atmosphere composed of 75 percent of nitrogen and 25 percent of hydrogen under a pressure of 1 kp/cm². The hardness of the friction member thus obtained is 1,100° or the Knoop scale.

e. Submersion of the bearing member during 10 hours in a bath of silicone oil such as DC 200/1000 c St (Trade Mark) having a temperature of 60°C., f. Fine blanking or gaging of at least the bore of the thus obtained bearing member according to one of FIGS. 1 to 4, whereby the removed material has a thickness of 0.01 to 0.02 mm. A thus obtained bearing may have, for example, the following dimensions:

| outer diameter | 0.80 mm |
|---|---|
| diameter of the bore | 0.24 mm |
| height of the bearing | 0.20 mm |

PROCEDURE 2

To obtain a bearing member as described above, but having a porosity before the soaking of 20 percent of the total volume and a hardness of 1,255° Knoop, the following procedure is carried out:

Steps (a) and (b) are the same as in procedure 1.

c. Cold compressing the mixture under a pressure of 4 metric tons/cm², applied for 70 seconds.

The succeeding steps (d), (e) and (f) are identical to those of procedure 1.

PROCEDURE 3

Further, it is possible to produce a bearing having a porosity of 12 percent of the total volume and a hardness of 1,310° Knoop. To obtain a member having these characteristics, the following alternative procedure is applicable:

Steps (a) and (b) are the same as in procedure 1. c. Cold compression of the mixture under a pressure of 10 metric tons/cm² for 60 seconds.

Again, steps (d), (e) and (f) are the same as in procedure 1. The above procedures 1 to 3 may change is the materials of the base material change.

EXAMPLE 23

The following particles are used to form the base material:

| Copper | 98% by weight |
|---|---|
| Beryllium | 2% by weight |
| Size of powder particles | 1 – 2 microns |
| To produce a bearing having an outer diameter of | 1.20mm |
| a diameter of the hole of | 0.35mm |
| and a height of | 0.30mm | presenting a porosity of 25 percent of the total volume and a hardness of 158° Knoop, the following steps are carried out:

PROCEDURE 4 a. Admixing 1 percent by volume of zinc stearate with the metal powders listed above;

b. Mixing of all these materials for a period of 60 hours.

The remaining steps are as in Example 22.

EXAMPLE 24

To produce a bearing presenting an

| outer diameter of | 1.30 mm |
|---|---|
| diameter of the hole of | 0.40 mm |
| height of | 0.35 mm |
| hardness of | 130° Knoop and | porosity before the soaking of 20 percent of the total volume, the following elements have to be admixed to form the base material:

|  | % by volume |
|---|---|
| Iron | 96.5 |
| Nickel | 2 |
| Molybdenum | 0.5 |
| Zinc stearate | 1 |

The size of the powder particles does not exceed 3 microns. To obtain with these ingredients a bearing as described above, the following procedure is used:

PROCEDURE 6 a. Mixing of the powders during 50 hours, b. Cold compression of the mixture so obtained at a pressure of 5 metric tons/cm² applied during 30 seconds. Porosity obtained is 20 percent of the total volume, c. Thermal treatment at 1,200°C during 1 hour in a pure hydrogen atmosphere at normal pressure, d. Soaking of the piece during 8 hours in a "Synt-A-Lube" oil bath (Trade Mark) having a temperature of 50°C, under a vacuum of 1 Torr.

e. Finishing of at least the hole of the bearing in a fine blanking press, whereby the removed material has a thickness of 0.01 to 0.02 mm.

The oil in which the piece is treated during step (d) has a viscosity of 16° Engler at a temperature of 20°C.

It should be noted that the compressed pieces will shrink between 17 and 20 percent of their volume during the thermal treatment. This is true for all given examples and procedures, if the final dimensions of the bearings so manufactured do not exceed the following values:

| | |
|---|---|
| outer diameter | 0.8 to 1.3 mm |
| diameter of the bore | 0.1 to 0.4 mm |
| height | 0.2 to 0.4 mm |

It should be further noted that the final porosity of the bearing according to example 22 and procedure 1, after the soaking operation, will be about 12 percent of the total volume, because the rest is filled with the lubricant. The final porosity of the friction member according to example 24 and procedure 6 will be about 8 percent.

The addition of a metallic soap as indicated above presents the particular advantage that in the compression mold the upper piece member $a$ and compression piece $e$ (FIG. 5) are lubricated, so that the compressed material will not stick to the wall of the mold.

It is important to note that the thermal treatment operations described above can in certain cases be omitted, if the mixture of powders is subjected to a hot compression treatment. In these cases the two operations of compression and thermal treatment are carried out simultaneously.

Further, the processes of compression and thermal treatment can be repeated as many times as is necessary, depending upon the particular materials used, the shape of the final product, and the necessity of improving the physical or chemical properties of the materials forming the bearing member. Therefore procedure 4, as well as all other procedures and examples, are only given as illustrative examples and are not limitative.

It has been stated above that solid lubricants, such as, for example, polytetrafluorethylene (Teflon) can be introduced into the pores of the base material. In such a case the following procedure can be carried out:

PROCEDURE 7

Any one of the compressed and/or heat treated pieces according to any one of the above mentioned examples and procedures, is a. immersed during 6 hours under 1 Torr pressure in an aqueous dispersion containing 33 to 61 percent by weight of "Teflon TFE" (Trade Mark) having a particle size of 0.2 micron.

b. thermally treated in an oven at 260°C for 4 hours in a normal atmosphere, to sinter the particles of the PTFE.

With such a procedure it is possible to fill 80 percent of the volume of the pores of the compressed pieces.

Depending upon the use of the friction member according to the invention, it may be further subjected to chemical treatments or to irradiation.

Where, for example, a compressed and heat treated piece has been subjected for 10 minutes to a soaking operation in a "Polyamid-12" bath having a temperature of 176°C, so that the resultant porosity is 8 percent of the total volume, the following chemical treatment may improve the self-lubricating characteristic of the bearing:

TREATMENT 1 a. Washing the compressed and heat treated piece during 1 minute in a bath of isopropyl alcohol having a temperature of about 20°C., b. immersing the piece during 1 minute in a solution containing 10 percent by weight of silicone oil DC 200/1000 $c$ ST and 90 percent of weight of Xylol, wherein the bath has a temperature of 20°C, c. centrifuging and drying the piece during 1 minute in hot air at 60°C. By this treatment the Polyamide-12 absorbs 0.5 to 1 percent of weight of silicone oil.

In the event that a compressed and heat treated piece has been subjected to a soaking operation filling its pores at 80 percent with a thermoplastic material of linear polarization, e.g. a polyester, the following treatment may harden the surface layer of the piece:

TREATMENT 2

Subject the friction member during 100 hours to high energy gamma radiation to increase the initial hardness of the surface layer from 10 to 12 percent.

EXAMPLE 25

A composition comprising:

| | |
|---|---|
| Aluminum oxide: | 98.9 % by volume |
| Zinc stearate: | 1.1 % by volume | was subjected to the following treatments:

a. Mixing the powders for 40 hours.

b. Cold compression of the mixture under a pressure of metric tons/cm² applied for 30 seconds, which permits a porosity of 18 percent of the total volume to be obtained.

c. Thermal treatment at 1800°C for 3 hours in a nitrogen atmosphere.

d. Soaking under a 1 Torr vacuum, at 50°C for 12 hours, in a medium of a synthetic oil having a viscosity of 16° Engler at 20°C.

e. Finishing operation.

What is claimed is:

1. A self-lubricating bearing member comprising a porous metallic base material selected from the group consisting of a metal, a metal alloy, a metal carbide, a metal nitride, a metal boride, a metal silicide, a metal oxide, and mixtures thereof having a porosity of between about 1 and about 40 percent by volume and a hardness of between about 200° and about 2,400° Vickers, the pores of which are filled with a lubricant having a coefficient of friction of between about 0.002 and about 0.300 and viscosity of at least 1.5° Engler at the temperature of use.

2. The bearing member of claim 1 which also includes a metal soap.

3. A bearing member according to claim 1, in which the base material is an alloy of iron, nickel and molybdenum.

4. A bearing member according to claim 1 in which the base material is an alloy of copper and beryllium.

5. A bearing member according to claim 1 in which the base material is composed of tungsten carbide, aluminum oxide and cobalt metal.

6. Method for the manufacture of a self-lubricating bearing member comprising the steps of:
   a. forming a homogeneous mixture of a metallic base material selected from the group consisting of a metal, a metal alloy, a metal carbide, a metal nitride, a metal boride, a metal silicide, a metal oxide, and mixtures thereof, and a metal soap, these components being in a pulverulent state;
   b. compressing the mixture of metallic base material and metal soap at a pressure between about 2 and about 15 metric tons per square centimeter;
   c. subjecting the compressed mixture to a thermal treatment in an inert atmosphere at a temperature between about 1,200° and about 1,800°C for a sufficient period of time to impart thereto a porosity of between about 1 and about 40 percent by volume;
   d. introducing a lubricant into the pores of the product of step (c); and
   e. shaping the product into a bearing member.

7. The method of claim 6 in which the particle size of the metallic base material is in the range of about 0.5 to about 6 microns.

8. The method of claim 6 in which said lubricant has a coefficient of friction of between about 0.002 and about 0.300 and a viscosity of at least 1.5° Engler at the temperature of use.

9. The method of claim 6 in which said lubricant is a silicone oil.

10. The method of claim 6 in which the metal soap is zinc stearate.

11. The method of claim 6 in which the lubricant is a thermoplastic resin.

12. The method of claim 6 in which the lubricant is a thermosetting resin.

13. The method of claim 6 in which the bearing member is subjected to high energy radiation after formation to increase the hardness of the surface layer thereof.

* * * * *